United States Patent
Pyun et al.

(10) Patent No.: US 10,059,374 B2
(45) Date of Patent: Aug. 28, 2018

(54) IMPACT ABSORPTION UNIT, MANUFACTURING METHOD OF IMPACT ABSORPTION UNIT, AND IMPACT ABSORPTION REINFORCEMENT

(71) Applicant: Hyundai Motor Company, Seoul (KR)

(72) Inventors: Sung Don Pyun, Suwon-si (KR); Chang Dong Kim, Suwon-si (KR); Min Soo Kim, Suwon-si (KR); Hoon Chang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/357,780

(22) Filed: Nov. 21, 2016

(65) Prior Publication Data

US 2017/0291641 A1   Oct. 12, 2017

(30) Foreign Application Priority Data

Apr. 12, 2016 (KR) .................. 10-2016-0044860

(51) Int. Cl.
| | |
|---|---|
| B62D 25/00 | (2006.01) |
| B62D 21/15 | (2006.01) |
| B62D 25/02 | (2006.01) |
| B60R 19/34 | (2006.01) |
| B62D 29/04 | (2006.01) |

(52) U.S. Cl.
CPC .............. *B62D 21/15* (2013.01); *B60R 19/34* (2013.01); *B62D 21/157* (2013.01); *B62D 25/025* (2013.01); *B62D 29/043* (2013.01); *B60Y 2410/122* (2013.01)

(58) Field of Classification Search
CPC ...... B62D 21/15; B62D 21/157; B62D 25/20; B62D 25/025; B62D 25/06; B60R 19/34
USPC ..... 296/209, 193.06, 210; 192/133; 293/133
See application file for complete search history.

(56) References Cited

U.S. PATENT DOCUMENTS

| | | | | |
|---|---|---|---|---|
| 6,270,131 | B1 * | 8/2001 | Martinez ................ | B60R 19/34 188/371 |
| 7,097,234 | B2 * | 8/2006 | Schonebeck ........... | B60R 19/22 296/153 |
| 9,598,033 | B1 * | 3/2017 | Berger ................... | B60R 19/03 |
| 2012/0074735 | A1 | 3/2012 | Engertsberger et al. | |
| 2017/0217393 | A1 * | 8/2017 | Mohapatra ............. | B60R 19/34 |

FOREIGN PATENT DOCUMENTS

| | | |
|---|---|---|
| JP | 10-76893 A | 3/1998 |
| JP | 2005-273872 A | 10/2005 |
| JP | 2010-247789 A | 11/2010 |
| JP | 2015-044461 A | 3/2015 |
| KR | 10-0365111 B1 | 12/2002 |

\* cited by examiner

*Primary Examiner* — Dennis H Pedder
(74) *Attorney, Agent, or Firm* — Morgan, Lewis & Bockius LLP

(57) ABSTRACT

An impact absorption unit provided between an inside member and an outside member that form a vehicle body and configured to absorb an impact may include: a first absorption body which includes composite material and protrudes from an inside surface of the inside member toward the outer member, with an open receiving space formed in the first absorption body; and a second absorption body which includes composite material and protrudes from an inside surface of the outside member toward the inside member such that the second absorption body is inserted into the open receiving space.

8 Claims, 6 Drawing Sheets

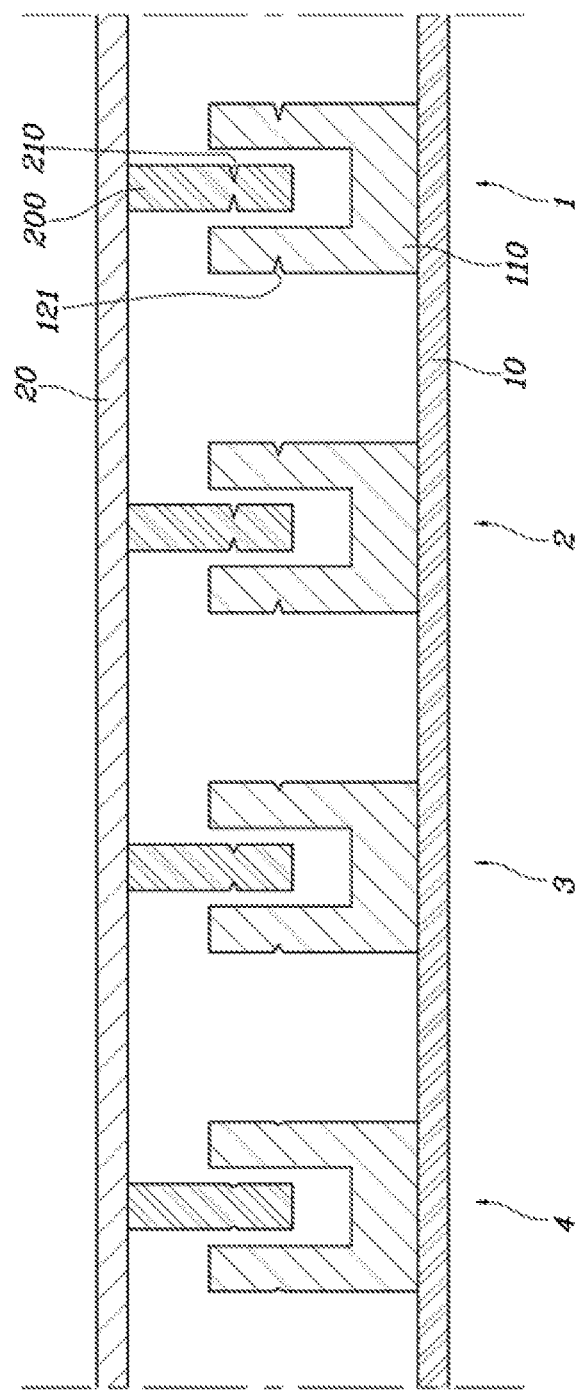

IMPACT ABSORPTION UNIT, MANUFACTURING METHOD OF IMPACT ABSORPTION UNIT, AND IMPACT ABSORPTION REINFORCEMENT

CROSS REFERENCE TO RELATED APPLICATION

The present application claims priority of Korean Patent Application No. 10-2016-0044860 filed on Apr. 12, 2016, the entire contents of which is incorporated herein for all purposes by this reference.

BACKGROUND OF THE INVENTION

Field of the Invention

The present invention relates to an impact absorption unit which is configured such that when a vehicle collision occurs, sequential fractures are induced in a sequence from a second absorption body coupled to an outside member of a vehicle to a first absorption body coupled to an inner member, whereby a collision load can be effectively dispersed.

Description of Related Art

Due to anisotropy and brittle fracture characteristics that are characteristics of composite material formed of resin and reinforced fiber such as carbon fiber, the composite material has been restrictively used in an impact absorption unit provided to cope with a collision. Furthermore, there is a problem in that if an excessive amount of material for reinforcement is used, it counters the effects of a reduction in the weight of a vehicle.

Therefore, required is an impact absorption unit which can successively control fractures resulting from a collision load and effectively disperse the collision load, thus overcoming the limitations of composite material.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an impact absorption unit which is configured such that when a vehicle collision occurs, sequential fractures are induced in a sequence from a second absorption body coupled to an outside member of a vehicle to a first absorption body coupled to an inner member, whereby a collision load can be effectively dispersed.

According to one aspect, there is provided an impact absorption unit provided between an inside member and an outside member that form a vehicle body and configured to absorb an impact, the impact absorption unit including: a first absorption body including composite material and protruding from an inside surface of the inside member toward the outer member, with an open receiving space formed in the first absorption body; and a second absorption body including composite material and protruding from an inside surface of the outside member toward the inside member such that the second absorption body is inserted into the open receiving space.

A protruding end of the first absorption body may be spaced apart from the inside surface of the outer member, and an end of the second absorption body that is inserted into the open receiving space may be spaced apart from an inside surface of the open receiving space.

A length to which the second absorption body protrudes may be greater than a depth of the open receiving space.

The first absorption body may include: a cushion part attached to the inside member and configured to contact with the second absorption body when a collision load is applied to the outer member; and a receiving part extending from the cushion part toward the outside member and receiving the second absorption body in the open receiving space.

A cross-section of the receiving part that is taken in a direction perpendicular to a longitudinal direction of the receiving part may be a closed cross-section.

A first fracture notch depressed inward may be formed in an outside surface of the receiving part. A second fracture notch depressed inward may be formed in an outside surface of the second absorption body, and a depth of the second fracture notch may be greater than a depth of the first fracture notch.

An area of a cross-section of the receiving part that is taken, at a position corresponding to the first fracture notch, in a direction perpendicular to a longitudinal direction of the receiving part may be greater than an area of a cross-section of the second absorption body that is taken, at a position corresponding to the second fracture notch, in a direction perpendicular to a longitudinal direction of the second absorption body.

A distance between the inside surface of the outside member and an end of the receiving part may be greater than a distance an end of the cushion part and the end of the second absorption body.

According to another aspect, there is provided a manufacturing method of an impact absorption unit provided between an inside member and an outside member that form vehicle body and configured to absorb an impact, the manufacturing method including: a provision operation of forming a first absorption body using reinforced fiber and resin, the first absorption body having a receiving space that is open on a first side thereof, and of coupling a second side of the first absorption body to an inside surface of the inner member; forming a second absorption body using reinforced fiber and resin, the second absorption body having a protruding shape; coupling the second absorption body to an inside surface of the outer member; and assembling the inside member with the outside member such that the second absorption body is inserted into the open receiving space of the first absorption body.

The coupling may include: disposing the second absorption body in a mold; stacking a preform on the second absorption body in the mold; and an injection operation of closing the mold and injecting resin into the mold to form the outer member, and thus integrally forming the second absorption body and the outer member.

The coupling may include: disposing the second absorption body in a mold; stacking a prepreg on the second absorption body in the mold; and a pressurizing operation of closing the mold and applying pressure to the mold, and thus integrally forming the second absorption body and the outer member.

The forming may include forming the second absorption body such that a flange is provided on an end of the second absorption body. The coupling may include: a preparation operation of forming in the outside member a through hole having a stepped structure such that a diameter of the through hole on an outside surface of the outside member corresponds to a diameter of the flange, and a diameter of the through hole on the inside surface of the outside member is less than the diameter of the flange; and a bonding operation of inserting the second absorption body provided with the flange into the through hole in a direction from an outside surface of the outside member so that the second absorption body is coupled with the outer member, and fixing the second absorption body with the outside member using an adhesive.

According to still another aspect, there is provided an impact absorption reinforcement provided between an inside member and an outside member that form a vehicle body and configured to absorb an impact, the impact absorption reinforcement including: a plurality of impact absorption units. Each of the impact absorption units may include: a first absorption body including composite material and protruding from an inside surface of the inside member forming the vehicle body toward the outer member, with an open receiving space formed in the first absorption body; and a second absorption body including composite material and protruding from an inside surface of the outside member toward the inside member such that the second absorption body is inserted into the open receiving space. The impact absorption units may be positioned such that each pair of impact absorption units are symmetrical with each other based on one central impact absorption unit.

The first and second absorption bodies of each of the impact absorption units may be spaced apart from each other by a predetermined distance. As a distance from the one central impact absorption unit is increased, the predetermined distance between the first absorption body and the second absorption body may be increased.

A fracture notch depressed inward may be formed in an outside surface of each of the first and second absorption bodies of the impact absorption unit. As a distance from the one central impact absorption unit is increased, a depth of the fracture notch may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a view illustrating that as the distance from the first central impact absorption unit 1 is increased, the depths of the fracture notches are reduced, according to line A-A' indicated in the FIG. 5.

Figure 1:
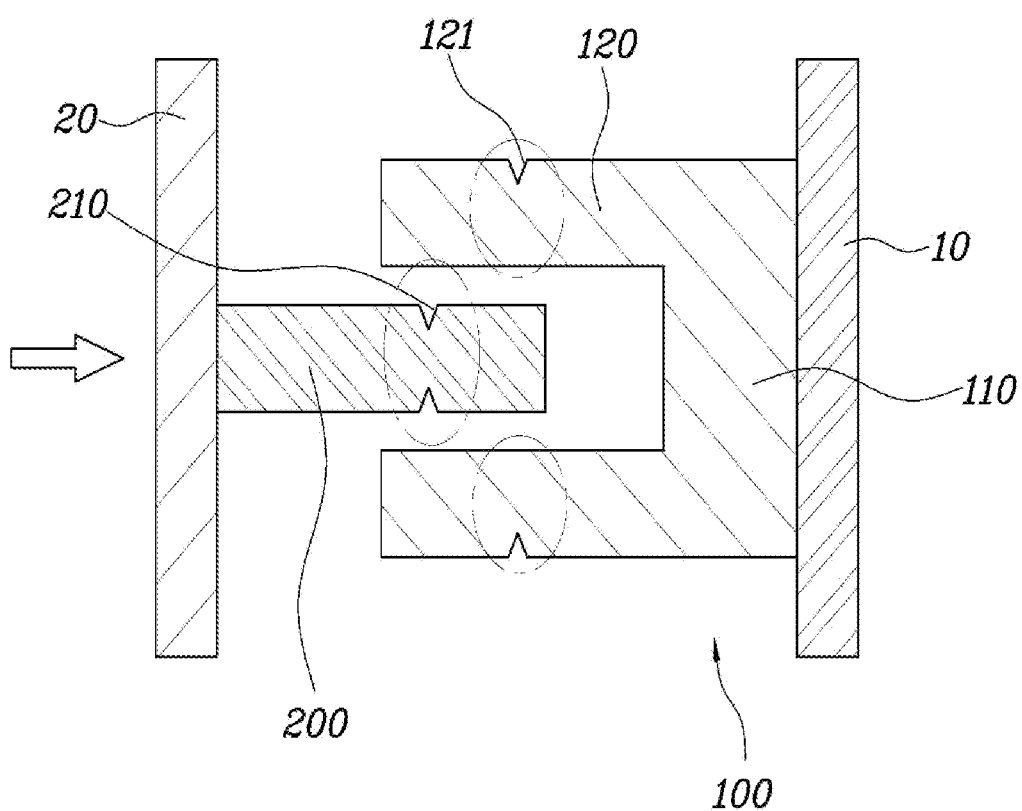
FIG. 1 is a view illustrating an impact absorption unit according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an embodiment of the present invention will be described with reference to the attached drawings.

An impact absorption unit according to the embodiment of the present invention is an impact absorption unit provided, to absorb impact, between an inside member 10 and an outside member 20 which form a vehicle body. As shown in FIG. 1, the impact absorption unit includes: a first absorption body 100 which includes composite material and protrudes from an inside surface of the inside member 10 toward the outside member 20 with an open receiving space formed in the first absorption body 100; and a second absorption body 200 which includes composite material and protrudes from an inside surface of the outside member 20 toward the inside member 10 such that the second absorption body 200 is inserted into the open receiving space.

In detail, a protruding end of the first absorption body 100 may be spaced apart from the inside surface of the outside member 20, and an end of the second absorption body 200 inserted into the open receiving space may be spaced apart from an inside surface of the open receiving space.

The first absorption body 100 is coupled to the inside member 10 of the vehicle body, and extends from the inside member 10 and provides the open receiving space therein. A cross-section of the first absorption body 100 taken in a direction perpendicular to a longitudinal direction in which the first absorption body 100 extends, forms a closed cross-section and extends in the direction perpendicular to a longitudinal direction so that the open receiving space can be formed in the first absorption body 100. The first absorption body 100 includes composite material formed of reinforced fiber and resin. Carbon fiber, glass fiber, aramid fiber, etc. may be used as the reinforced fiber. Thermoplastic resin, thermosetting resin, etc. may be used as the resin. However, the present invention is not limited to the above examples.

The second absorption body 200 is coupled to the outside member 20 of the vehicle body and extends from the outside member 20 toward the inside member 10 such that the second absorption body 200 is inserted into the open receiving space of the first absorption body 100. The second absorption body 100 is also made of composite material formed of reinforced fiber and resin in a same manner as that of the first absorption body 100. Carbon fiber, glass fiber, aramid fiber, etc. may be used as the reinforced fiber. Thermoplastic resin, thermosetting resin, etc. may be used as the resin. However, the present invention is not limited to the above examples.

The second absorption body 200 is configured such that it is inserted into the open receiving space of the first absorption body 100, but the end of the second absorption body 200 is spaced apart from the first absorption body 100 by a predetermined distance so that the first and second absorption bodies 100 and 200 do not make contact with each other. Therefore, when a collision load is applied to the outside member 20, the second absorption body 200 coupled to the outside member 20 moves toward the inside member 10, and the end of the second absorption body 200 collides with the first absorption body 100. During this process, the second absorption body 200 is first fractured, thus absorbing impact. Thereafter, the first absorption body 100 is fractured, thus secondarily absorbing the impact. Accordingly, the collision load can be dispersed.

That is, the second absorption body 200 of the outside member 20 first absorbs the impact, so that some of the collision load is first dispersed to the outside member 20 by the medium of the second absorption body 200. A remaining collision load is absorbed to the first absorption body 100 and dispersed to the inside member 10 by the medium of the first absorption body 100. Therefore, effective load dispersion can be achieved by such sequential fractures.

In an exemplary embodiment of the present invention, the inside member 10 and the outside member 20 have panel shapes and are assembled with each other to form the vehicle body. For instance, the inside member 10 and the outside member 20 form a center pillar, a side sill, a bumper beam, a roof side rail, etc. of the vehicle body. In addition, there is need for an impact absorption unit such as that of the present invention to be mounted between the inside member 10 and the outside member 20 to disperse a collision load applied to the vehicle body, for example, when the vehicle collision occurs.

The inside member 10 and the outside member 20 may include metal including steel, aluminum, magnesium, etc., or including composite material formed of reinforced fiber and resin.

The length to which the second absorption body 200 protrudes may be greater than the depth of the open receiving space. In detail, when a collision load is applied to the outside member 20, a primary fracture of the second absorption body 200 may be induced. Therefore, when the length to which the second absorption body 200 protrudes toward the inside member 10 may be greater than the depth of the open receiving space formed in the first absorption body 100, the end of the second absorption body 200 can collide with the first absorption body 100 before the end of the first absorption body 100 collides with the outside member 20. The second absorption body 200 can be induced to be fractured earlier than the first absorption body 100.

The first absorption body 100 may include: a cushion part 110 which is attached to the inside member 10 and configured to contact with the second absorption body 200 when a collision load is applied to the outside member 20; and a receiving part 120 which extends from the cushion part 110 toward the outside member 20 and receives the second absorption body 200 in the open receiving space.

A lower end of the cushion part 110 is coupled to the outside member 20. An upper end of the cushion part 110 is a portion with which the end of the second absorption body 200 collides when the second absorption body 200 collides with the first absorption body 100. Due to a presence of the cushion part 110, the end of the second absorption body 200 makes contact with the cushion 110, rather than directly applying impact to the inside member 10, thus preventing the inside member 10 from being damaged.

The receiving part 120 extends from the upper end of the cushion part 110 toward the outside member 20 and has therein the open receiving space into which the second absorption body 200 is inserted. Therefore, a cross-section of the receiving part 120 taken in the direction perpendicular to a longitudinal direction of the receiving part 120 may form a closed cross-section. After the end of the second absorption body 200 is fractured by collision with the cushion part 110, the upper end of the receiving part 120 collides with the outside member 20 so that the receiving part 120 is fractured.

A first fracture notch 121 depressed inward is formed in an outside surface of the receiving part 120. A second fracture notch 210 may be formed in an outside surface of the second absorption body 200 and depressed inward to a depth greater than a depth to which the first fracture notch 121 is depressed. Therefore, the area of the cross-section of the receiving part 120 that is taken, at a position corresponding to the first fracture notch 121, in the direction perpendicular to a longitudinal direction of the receiving part 120 may be greater than the area of the cross-section of the second absorption body 200 that is taken, at a position corresponding to the second fracture notch 210, in the direction perpendicular to a longitudinal direction of the second absorption body 200.

To induce the second absorption body 200 to be fractured by a collision load applied to the outside member 20, the first fracture notch 121 is formed in an outside surface of the receiving part 120, and the second fracture notch 210 having a depth greater than that of the first fracture notch 121 is formed in an outside surface of the second absorption body 200. Then, when a collision load is applied to the outside member 20, the second absorption body 200 having a comparatively small cross-section is first fractured, and then the receiving part 120 having a comparatively large cross-section is fractured. In this way, fracture operations can be sequentially performed.

Furthermore, to induce the sequential fracture operations, the distance between the outside member and the end of the receiving part 120 may be greater than the distance the end of the cushion part 110 and the end of the second absorption body 200. Given the fact that the primary fracture of the second absorption body 200 by the collision load applied to the outside member 20 may be induced, when the distance between the outside member 20 and the end of the receiving part 120 is greater than the distance between the end of the cushion part 110 and the end of the second absorption body 200, the end of the second absorption body 200 collides with the cushion body 110 before the end of the receiving part 120 collies with the outside member 20. Accordingly, the second absorption body 200 can be induced to be fractured earlier than the first absorption body 100.

In addition, to induce the sequential fracture operations from the second absorption body 200 to the first absorption body 100, the first and second absorption bodies 100 and 200 may be configured such that the strength of reinforced fiber of the composite material forming the first absorption body 100 is higher than that of the second absorption body 200, or the reinforced fiber content in the composite material forming the first absorption body 100 is higher than that of the second absorption body 200.

A manufacturing method of the impact absorption unit according to an exemplary embodiment of the present invention is a method of manufacturing an impact absorption unit provided, to absorb impact, between the inside member 10 and the outside member 20 which form the vehicle body. The manufacturing method includes: a provision operation of forming the first absorption body 100 using reinforced fiber and resin, the first absorption body 100 having the open receiving space which is open on a first side thereof, and of coupling a second side of the first absorption body to the inside surface of the inside member 10; an operation of forming the second absorption body 200 using reinforced fiber and resin, the second absorption body 200 having a protruding shape; an operation of coupling the second absorption body 200 to the inside surface of the outside member 20; and an operation of assembling the inside member 10 with the outside member 20 such that the second absorption body 200 is inserted into the open receiving space formed in the first absorption body.

The first absorption body 100 includes composite material formed of reinforced fiber and resin. The first absorption body 100 may be formed in such a way that a preform is located in a mold and then resin is injected into the mold, or in such a way that a prepreg is located in a mold and then pressed.

After the forming of the first absorption body 100 has been completed, the first absorption body 100 is coupled to the inside surface of the inside member 10, thus completing the provision operation.

After the provision operation has been completed, the operation of forming the second absorption body 200 is performed. In a same manner as the first absorption body 100, the second absorption body 200 may be formed in such a way that a preform is located in a mold and then resin is injected into the mold, or in such a way that a prepreg is located in a mold and then pressed.

After the forming of the second absorption body 200 may have been completed, the operation of coupling the second absorption body 200 to the inside surface of the outside member 20 is performed. Thereafter, the operation of assembling the inside member 10 with the outside member 20 such that the second absorption body 200 is inserted into the open receiving space of the first absorption body 100, is performed, thus completing the process of manufacturing the impact absorption unit.

Figure 2:
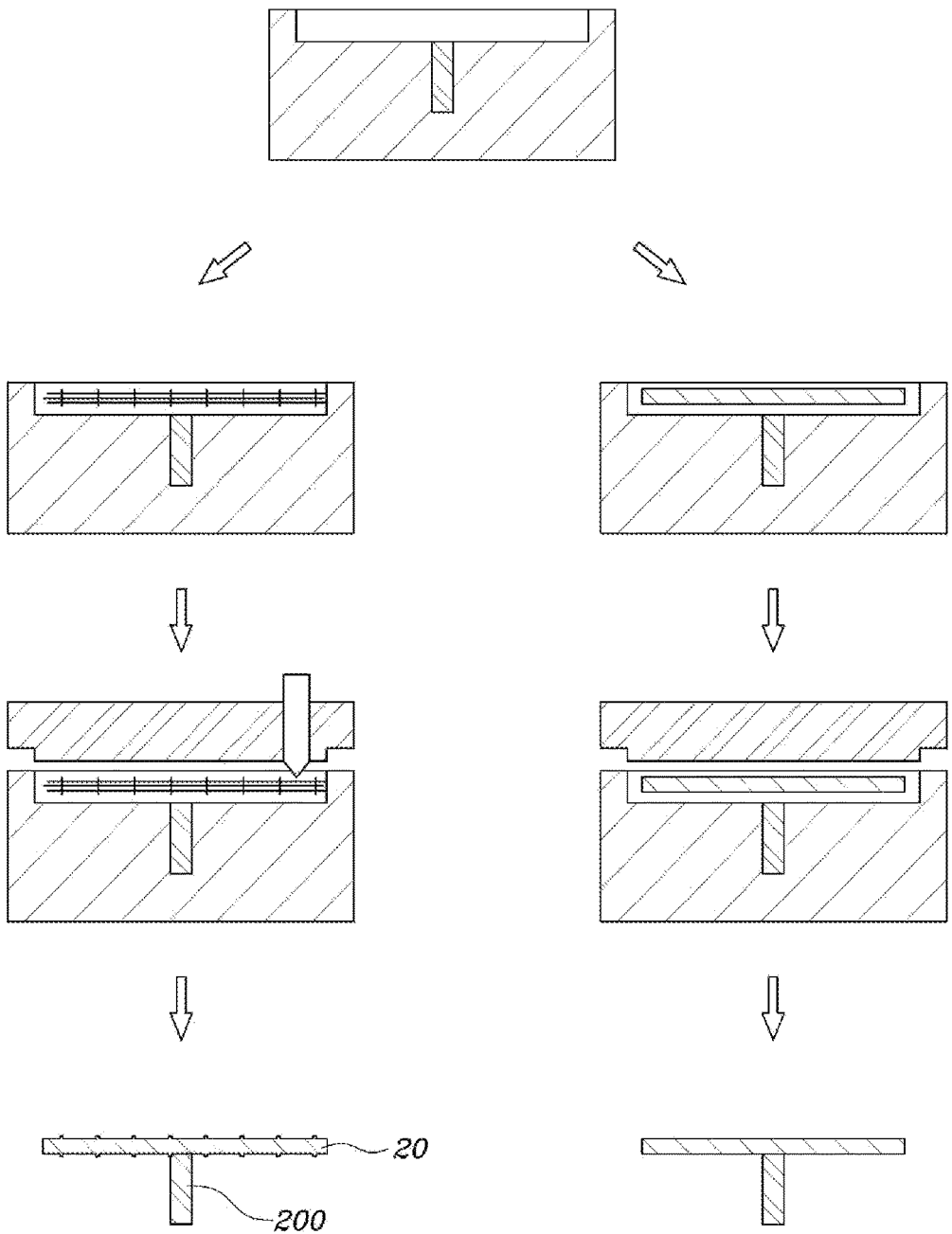
FIG. 2 illustrates a process of manufacturing a second absorption body according to the embodiment of the present invention.

The method of coupling the outside member 20 with the second absorption body 200 may be classified into a coupling method through an integrally forming process and a coupling method through a separately manufacturing and bonding process. The coupling method through the integrally forming process will be described in detail. As shown in FIG. 2, the operation of the coupling may include: an operation of disposing the second absorption body 200 in the mold; an operation of stacking the preform on the second absorption body 200 in the mold; and an injection operation of closing the mold, and injecting resin into the mold to form the outside member 20, and thus integrally forming the second absorption body 200 and the outside member 20.

Alternatively, the operation of the coupling may include: an operation of disposing the second absorption body 200 in the mold; an operation of stacking the prepreg on the second absorption body 200 in the mold; and a pressurizing operation of closing the mold and applying pressure to the mold, and thus integrally forming the second absorption body 200 and the outside member 20.

In the case where the outside member 20 of the vehicle body includes composite material formed of reinforced fiber and resin, the outside member 20 and the second absorption body 200 may be integrally formed by disposing a preformed second absorption body 200 in the mold, stacking a preform on the preformed second absorption body 200 in the mold, and injecting resin into the mold in a state in which the mold is closed and pressurized. Alternatively, the outside member 20 and the second absorption body 200 may be integrally formed by stacking a prepreg on the second absorption body 200 in the mold, closing the mold, and then applying pressure to the mold. In this way, the outside member 20 and the second absorption body 200 can be reliably coupled to each other.

Therefore, when a collision load is transmitted from the outside member 20 during a vehicle collision and thus the second absorption body 200 collies with the first absorption body 100, the second absorption body 200 may be reliably fractured without being undesirably removed from the outside member 20.

Figure 3:
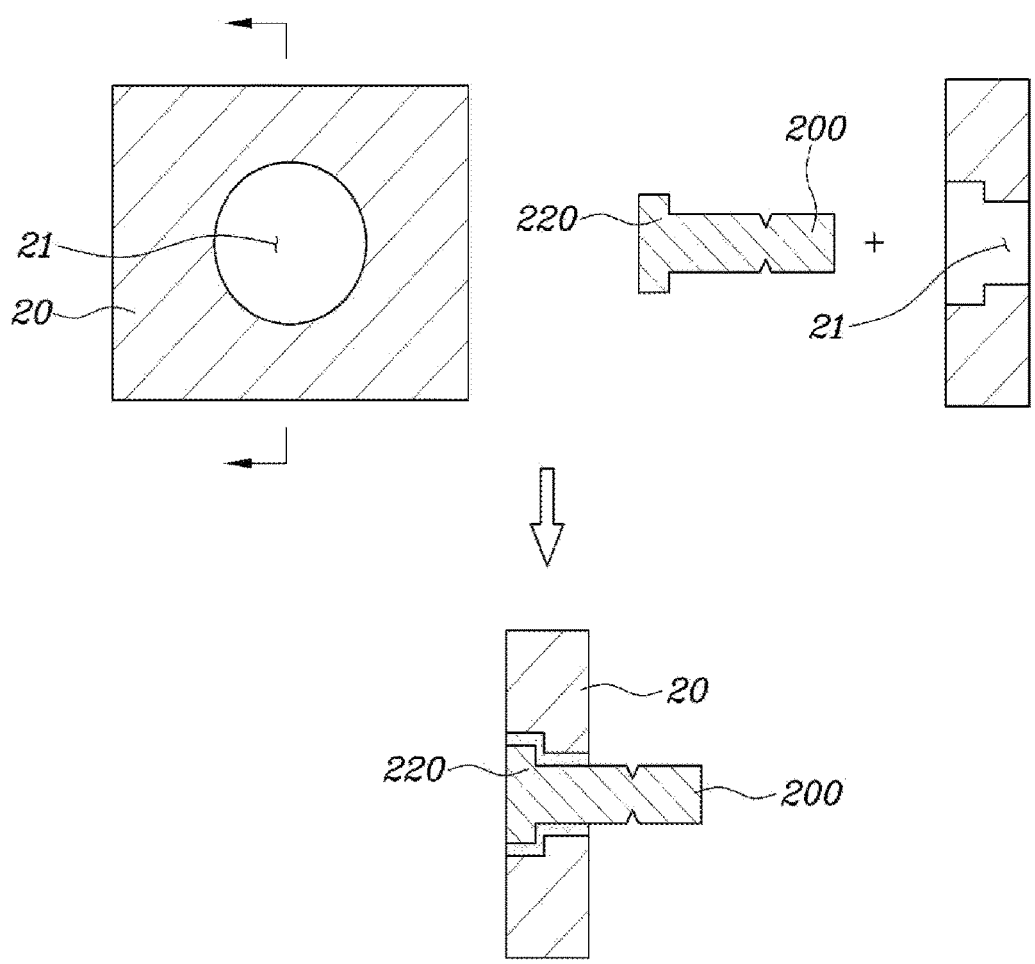
FIG. 3 illustrates a process of manufacturing the second absorption body according to the embodiment of the present invention.

The coupling method through the separately manufacturing and bonding process will be described in detail. As shown in FIG. 3, in the operation of the forming, the second absorption body 200 is formed such that a flange 200 is provided on an end of the second absorption body 200. The operation of the coupling may include: a preparation operation of forming in the outside member 20 a through hole 21 having a stepped structure such that the diameter of the through hole 21 on an outside surface of the outside member 20 corresponds to the diameter of the flange 220, and the diameter of the through hole 21 on the inside surface of the outside member 20 is less than the diameter of the flange 220; and a bonding operation of inserting the second absorption body 200 provided with the flange 220 into the through hole 21 in a direction from an outside surface of the outside member 20 so that the second absorption body 200 is coupled with the outside member 20, and fixing the second absorption body 200 with the outside member 20 using an adhesive.

First, the second absorption body 200 is formed such that the flange 220 is provided on the end of the second absorption body 200 in a shape in which the flange 220 is perpendicularly bent from the end of the second absorption body 200. Subsequently, in the preparation operation, the through hole 21 is formed to have a stepped structure such that the diameter of the through hole 21 on an outside surface of the outside member 20 differs from the diameter of the through hole 21 on the inside surface of the outside member 20.

Thereafter, the second absorption body 200 is inserted into the through hole 21 of the outside member 20 in a direction from an outside surface of the outside member 20 toward the inside surface thereof. Then, the second absorption body 200 is coupled to the outside member 20 in such a way that the flange 220 of the second absorption body 200 is stopped by the stepped portion of the through hole 21. Subsequently, the second absorption body 200 and the outside member 20 are bonded to each other by applying an adhesive to the junction therebetween.

Accordingly, the outside member 20 and the second absorption body 200 may be separately manufactured and mechanically coupled to each other. In this case, the outside member 20 and the second absorption body 200 can be reliably coupled to each other by the adhesive force of the adhesive.

Figure 4:
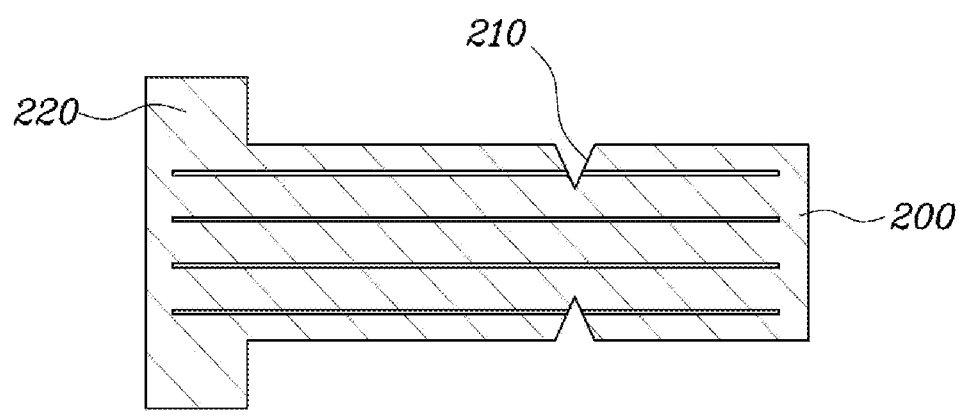
FIG. 4 is a view illustrating the second absorption body according to the embodiment of the present invention.

As shown in FIG. 4, the aligned direction of reinforced fibers of the second absorption body 200 may be in parallel with a longitudinal direction in which the second absorption body 200 extends. The collision load to be transmitted from the outside member 20 to the second absorption body 200 may be transmitted in the aligned direction of the reinforced fibers.

Figure 5:
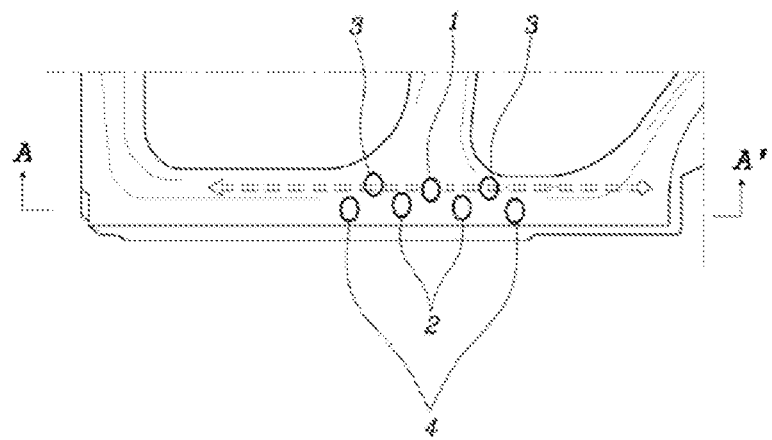
FIG. 5 is a views illustrating distribution of impact absorption units on an impact absorption reinforcement according to an embodiment of the present invention.

An impact absorption reinforcement according to an embodiment of the present invention is an impact absorption reinforcement provided, to absorb impact, between an inside member 10 and an outside member 20 which form a vehicle body. As shown in FIG. 5, the impact absorption reinforcement is configured with a plurality of impact absorption units. Each of the impact absorption units includes: a first absorption body 100 which includes composite material and protrudes from the inside surface of the inside member 10 toward the outside member 20 with an open receiving space formed in the first absorption body 100; and a second absorption body 200 which includes composite material, protrudes from the inside surface of the outside member 20 toward the inside member 10, and is configured to be inserted into the open receiving space. The impact absorption units are arranged such that each pair of impact absorption units are symmetrical with each other based on a central one impact absorption unit 1.

For example, after the one impact absorption unit 1 is fractured, a pair of impact absorption units positioned at positions of reference numeral 2 are fractured. Subsequently, after a pair of impact absorption units positioned at positions of reference numeral 3 are fractured, a pair of impact absorption units positioned at positions of reference numeral 4 are fractured. In this way, the collision load is dispersed in the direction of the arrows.

Figure 6:
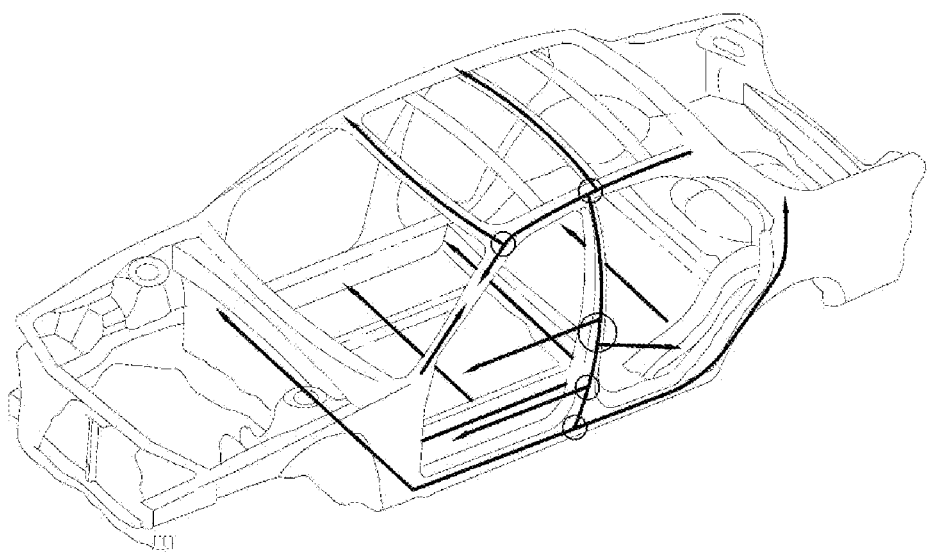
FIG. 6 is a view illustrating installation positions of the impact absorption reinforcement according to the embodiment of the present invention.

The load path of the collision load on the vehicle body during the vehicle collision is formed as shown in FIG. 6. A plurality of impact absorption units are positioned on the load path of the collision load. The plurality of impact absorption units are induced to be successively fractured along the load path based on the one impact absorption unit 1, whereby the collision load applied to the vehicle body can be dispersed.

The one impact absorption unit 1 is positioned at each of the positions indicated by the solid line circles of FIG. 6 at which frames of the vehicle body intersect with each other and form dispersion points of the collision load. Accordingly, the collision load can be induced to be dispersed.

Furthermore, each impact absorption unit is formed of the first absorption body 100 and the second absorption body 200 and configured such that fractures successively occur from the second absorption body 200 to the first absorption body 100, whereby the collision load can be dispersed.

The impact absorption reinforcement according to an exemplary embodiment of the present invention may be configured such that as the distance from the one central impact absorption unit 1 is increased, the distance between the first absorption body 100 and the second absorption body 200 is increased.

Due to the configuration such that as the distance from the one impact absorption unit 1 functioning as a base point is increased, the distance between the first absorption body 100 and the second absorption body 200 is increased, the impact absorption units can be successively fractured in such a way that the first impact absorption unit 1 is first fractured, a next pair of impact absorption units are thereafter fractured, and then a next pair of impact absorption units are fractured, the collision load can be dispersed along the load path.

As another method, each impact absorption unit has fracture notches which are depressed inward from the outside surfaces of the first and second absorption bodies 100 and 200, and may be configured such that as the distance from the first central impact absorption unit 1 is increased, the depths of the fracture notches are reduced. In this case, likewise, the impact absorption units can be successively fractured in such a way that the one impact absorption unit 1 is first fractured, a next pair of impact absorption units are thereafter fractured, and then a next pair of impact absorption units are fractured.

As described above, in an impact absorption unit according to an exemplary embodiment of the present invention, when a collision load is applied to an outer member, a second absorption body coupled to the outside member moves toward an inner member. As the end of the second absorption body collides with a first absorption body, the second absorption body first fractures and thus primarily absorbs the impact, and subsequently, the first absorption body fractures and thus secondarily absorbs the impact. Accordingly, the impact load can be effectively dispersed.

Since the second absorption body of the outside member first absorbs the impact, some of the impact load is dispersed to the outside member through the second absorption body, and the remaining impact load is absorbed to the first absorption body and thus dispersed to the inside member through the first absorption body. In this way, effective load dispersion can be achieved by sequential fractures.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An impact absorption unit provided between an inside member and an outside member that form a vehicle body and configured to absorb an impact, the impact absorption unit comprising:
    a first absorption body including composite material and protruding from an inside surface of the inside member toward the outer member, with an open receiving space formed in the first absorption body; and
    a second absorption body including composite material and protruding from an inside surface of the outside member toward the inside member such that the second absorption body is inserted into the open receiving space,
    wherein the first absorption body includes:
        a cushion part attached to the inside member and configured to contact with the second absorption body when a collision load is applied to the outer member; and
        a receiving part extending from the cushion part toward the outside member and receiving the second absorption body in the open receiving space, wherein a first fracture notch depressed inward is formed in an outside surface of the receiving part, and wherein a second fracture notch depressed inward is formed in an outside surface of the second absorption body, and a depth of the second fracture notch is greater than a depth of the first fracture notch.

2. The impact absorption unit according to claim 1, wherein a protruding end of the first absorption body is spaced apart from the inside surface of the outer member, and an end of the second absorption body that is inserted into the open receiving space is spaced apart from an inside surface of the open receiving space.

3. The impact absorption unit according to claim 2, wherein a length to which the second absorption body protrudes is greater than a depth of the open receiving space.

4. The impact absorption unit according to claim 1, wherein a cross-section of the receiving part that is taken in a direction perpendicular to a longitudinal direction of the receiving part is a closed cross-section.

5. The impact absorption unit according to claim 1, wherein an area of a cross-section of the receiving part that is taken, at a position corresponding to the first fracture notch, in a direction perpendicular to a longitudinal direction of the receiving part is greater than an area of a cross-section of the second absorption body that is taken, at a position corresponding to the second fracture notch, in a direction perpendicular to a longitudinal direction of the second absorption body.

6. The impact absorption unit according to claim 1, wherein a distance between the inside surface of the outside member and an end of the receiving part is greater than a distance between an end of the cushion part and an end of the second absorption body.

7. An impact absorption reinforcement provided between an inside member and an outside member that form a vehicle body and configured to absorb an impact, the impact absorption reinforcement comprising:

a plurality of impact absorption units, wherein each of the impact absorption units includes: a first absorption body including composite material and protruding from an inside surface of the inside member forming the vehicle body toward the outer member, with an open receiving space formed in the first absorption body; and a second absorption body including composite material and protruding from an inside surface of the outside member toward the inside member such that the second absorption body is inserted into the open receiving space, and wherein the impact absorption units are positioned such that each of the impact absorption units are symmetrical with each other based on one central impact absorption unit of the plurality of impact absorption units, wherein the first absorption body includes:

a cushion part attached to the inside member and configured to contact with the second absorption body when a collision load is applied to the outer member; and a receiving part extending from the cushion part toward the outside member and receiving the second absorption body in the open receiving space, wherein a first fracture notch depressed inward is formed in an outside surface of the receiving part, and wherein a second fracture notch depressed inward is formed in an outside surface of the second absorption body, and a depth of the second fracture notch is greater than a depth of the first fracture notch.

8. The impact absorption reinforcement according to claim 7, wherein as a distance from the one central impact absorption unit is increased, a depth of the first and second fracture notches is configured to be reduced.

\* \* \* \* \*